(12) United States Patent
Sakata et al.

(10) Patent No.: US 7,484,850 B2
(45) Date of Patent: Feb. 3, 2009

(54) ILLUMINATING DEVICE AND PROJECTOR

(75) Inventors: Hidefumi Sakata, Tatsuno-cho (JP); Susumu Aruga, Simosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 229 days.

(21) Appl. No.: 10/992,000

(22) Filed: Nov. 19, 2004

(65) Prior Publication Data
US 2005/0157263 A1 Jul. 21, 2005

(30) Foreign Application Priority Data
Nov. 27, 2003 (JP) .............................. 2003-397172

(51) Int. Cl.
G03B 21/14 (2006.01)
G03B 21/20 (2006.01)
G03B 21/28 (2006.01)
G03B 27/28 (2006.01)
G02B 5/30 (2006.01)
G02B 27/28 (2006.01)
A47F 3/00 (2006.01)
G02F 1/1335 (2006.01)
G03B 21/26 (2006.01)

(52) U.S. Cl. .............................. 353/20; 353/37; 353/94; 353/98; 353/102; 349/9; 359/489; 362/561; 385/901

(58) Field of Classification Search .................... 353/20, 353/37, 94, 102, 98, 31, 33, 34, 84; 349/9, 349/5, 7, 8; 359/486–489; 385/146, 901; 348/742, 743, 771; 362/551, 559, 560, 561
See application file for complete search history.

(56) References Cited

U.S. PATENT DOCUMENTS

| 6,067,193 | A | 5/2000 | Sekine et al. | 359/489 |
| 6,729,730 | B2 * | 5/2004 | Ito | 353/20 |
| 6,739,723 | B1 * | 5/2004 | Haven et al. | 353/20 |
| 6,843,566 | B2 * | 1/2005 | Mihara | 353/29 |
| 6,910,772 | B2 | 6/2005 | Yano | 353/20 |
| 6,921,176 | B2 * | 7/2005 | Tomita et al. | 353/94 |
| 6,966,656 | B2 | 11/2005 | Yano | 353/98 |
| 7,048,380 | B2 * | 5/2006 | Sokolov | 353/20 |
| 7,070,281 | B2 * | 7/2006 | Kato | 353/20 |
| 7,125,120 | B2 * | 10/2006 | Aruga | 353/20 |
| 7,131,735 | B2 * | 11/2006 | Yokoyama | 353/98 |

(Continued)

FOREIGN PATENT DOCUMENTS

CN 1363052 A 8/2002

(Continued)

*Primary Examiner*—Melissa J Koval
(74) *Attorney, Agent, or Firm*—Oliff & Berridge, PLC

(57) ABSTRACT

Aspects of the invention can provide an illuminating device and the like capable of efficiently supplying polarized light in a particular oscillation direction and suitable for a projector having a liquid crystal type spatial light modulator. The device can include a light source that supplies light, a collimating optical system that collimates the light from the light source into a substantially parallel light, and a reflecting type polarizing plate that transmits polarized light in a particular oscillation direction in the light from the collimating optical system and reflects polarized light in an oscillation direction different from the particular oscillation direction. The light source can include a reflecting portion that reflects light reflected by the reflecting type polarizing plate and advancing in the direction of the light source toward the collimating optical system.

11 Claims, 7 Drawing Sheets

U.S. PATENT DOCUMENTS

| | | | |
|---|---|---|---|
| 2002/0101659 A1* | 8/2002 | Hansen et al. | 359/486 |
| 2003/0071972 A1 | 4/2003 | Ito et al. | |
| 2003/0086066 A1* | 5/2003 | Kato | 353/20 |
| 2005/0146652 A1* | 7/2005 | Yokoyama et al. | 349/61 |
| 2005/0225728 A1 | 10/2005 | Yano | 353/20 |
| 2006/0153518 A1* | 7/2006 | Abu-Ageel | 385/146 |
| 2007/0024809 A1* | 2/2007 | Takahashi et al. | 353/20 |

FOREIGN PATENT DOCUMENTS

| | | |
|---|---|---|
| CN | 1415980 A | 5/2003 |
| CN | 1417636 A | 5/2003 |
| JP | A-4-127120 | 4/1992 |
| JP | A 11-006989 | 1/1999 |
| JP | A-2000-221499 | 8/2000 |
| JP | A-2002-250898 | 9/2002 |
| JP | A 2002-328430 | 11/2002 |
| JP | A-2003-057445 | 2/2003 |
| JP | A-2003-098597 | 4/2003 |
| JP | A-2003-202523 | 7/2003 |
| JP | A-2003-215705 | 7/2003 |
| JP | A-2003-329978 | 11/2003 |

* cited by examiner

ILLUMINATING DEVICE AND PROJECTOR

BACKGROUND OF THE INVENTION

1. Field of Invention

The invention relates to an illuminating device and a projector, and more particularly, to a technique for providing an illuminator for use in combination with a liquid crystal type spatial light modulator.

2. Description of Related Art

In related art projectors, the spatial extent in which an effective beam exists in an optical system including a light source and a spatial light modulator can be represented as the product of the area and the solid angle (etendue: geometrical extent). The product of the area and the solid angle can be conserved in the optical system. The angle that allows the spatial light modulator to take in light that can effectively be modulated is limited. Therefore, when the spatial extent of the light source increases, effective use of the beam from the light source is difficult.

A related art illuminating device for a projector including a liquid crystal type spatial light modulator has, for example, a PBS array as a member for polarization conversion. The PBS array divides a beam into two polarized beams that oscillate in approximately orthogonal directions to each other and one of the beams is converted by a phase plate. Therefore, the use of the PBS array approximately doubles the beam. Particularly when light emitting diodes (LEDs) as a solid light emitting device in an array are provided as a light source, the light emitting area of the light source is large. Consequently, the combination of an LED array and a PBS array should cause the beam to be enlarged and the illumination efficiency should be lowered. Therefore, with an array of LEDs, polarized light in a particular oscillation direction must be supplied without increasing the etendue. The technique for supplying polarized light in a particular oscillation direction without increasing the etendue is disclosed, for example, in Japanese Patent Laid-Open No. 2000-221499 and Japanese Patent Laid-Open No. 2003-57445.

SUMMARY OF THE INVENTION

In the disclosure of Japanese Patent Laid-Open No. 2000-221499, however, a polarization converting element is provided inside an LED. When the polarization converting element is provided in the LED, the LED is not easy to produce, and the reflecting type polarization film deteriorates by heat from the LED, which sometimes makes it difficult to carry out polarization conversion. In the disclosure of Japanese Patent Laid-Open No. 2003-57445, a reflecting surface is provided at the end plane of incidence of a rod integrator, and a polarization converting element is provided on the exit side of the rod integrator. At the end plane of incidence of the rod integrator, an opening to let in light from the light source is provided. Therefore, light reflected from the reflecting type polarizing plate can be let out from the opening and the light recycling efficiency by the rod integrator may be lowered. In order to let light from an array of LEDs come efficiently into the rod integrator, the rod integrator must have an increased size corresponding to the region to provide the LEDs, and a plurality of openings must be formed in the rod integrator corresponding to the LEDs.

The reflecting type polarizing plate can efficiently divide light coming in a direction approximately orthogonal to the reflecting type polarizing plate. On the other hand, in both of the above disclosures of Japanese Patent Laid-Open No. 2000-221499 and Japanese Patent Laid-Open No. 2003-57445, part of light comes to the reflecting type polarizing plate in an oblique direction. Therefore, it is difficult to efficiently divide the light. In this way, according to the related art techniques, polarized light in a particular oscillation direction cannot efficiently be supplied in some cases. Aspects of the invention can be directed to a solution to the disadvantages, and can provide an illuminating device capable of efficiently supplying polarized light in a particular oscillation direction and suitable for a projector having a liquid crystal type spatial light modulator and a projector using the illuminating device.

An exemplary illuminating device according to the invention can include a light source that supplies light, a collimating optical system that collimates light from the light source into a substantially parallel beam, and a reflecting type polarizing plate that transmits polarized light in a particular oscillation direction in the light from the collimating optical system and reflects polarized light in another oscillation direction different from the particular oscillation direction, and a reflecting portion that reflects the light reflected by the reflecting type polarizing plate to advance toward the light source in the direction of the collimating optical system.

In the incoming light to the reflecting type polarizing plate, polarized light in a particular oscillation direction can be transmitted through the reflecting type polarizing plate. Meanwhile, light in another oscillation direction other than the particular oscillation direction is reflected by the reflecting type polarizing plate and returns toward the light source. When the reflecting portion is provided at the light source, for example, light returning from the reflecting type polarizing plate to the light source can be reflected by the reflecting portion and again advances toward the reflecting type polarizing plate. The collimating optical system provided between the light source and the reflecting type polarizing plate causes the light reflected by the reflecting type polarizing plate to advance in the substantially same path in which the light has advanced toward the reflecting type polarizing plate. Therefore, the light reflected by the reflecting type polarizing plate can efficiently be returned to the light source. In this way, in the process in which polarized light recycles in the optical path between the reflecting portion and the reflecting type polarizing plate, polarized light in a particular oscillation direction can sequentially be extracted by the reflecting type polarizing plate. Consequently, polarized light in the particular oscillation direction can be obtained with high use efficiency.

Since the light from the light source is collimated into a substantially parallel beam by the collimating optical system, light from the light source is entered in a direction substantially orthogonal to the reflecting type polarizing plate. Since the light from the light source is entered in a direction substantially orthogonal to the reflecting type polarizing plate, the light from the light source can be efficiently separated. Furthermore, since the reflecting type polarizing plate is provided outside the light source, it can be prevented from being deteriorated by heat from the light source and the light source can readily be produced. The illuminating device according to the invention can supply polarized light in a particular oscillation direction without doubling the beam from the light source. Therefore, the beam from the light source can effectively be used in the optical system in the projector. The effective use of the beam from the light source allows the device to readily adapt to the arrangement of a plurality of light sources in an array. In this way, polarized light in a particular oscillation direction can sufficiently be supplied and an illuminating device suitable for a projector having a liquid crystal type spatial light modulator can be provided.

According to an exemplary embodiment of the invention, the collimating optical system can preferably a collimator lens or/and a reflector. Since a collimator lens or/and a reflector are provided, light from the light source can be converted into a substantially parallel beam.

Preferably, according to exemplary embodiments of the invention, a plurality of light sources in an array can be provided, and a plurality of collimating optical systems and a plurality of reflecting type polarizing plates are provided in an array corresponding to the light sources. As in the foregoing, the illuminating device according to the invention can readily be adapted to a plurality of light sources arranged in an array. Since the collimating optical systems and the reflecting type polarizing plates are provided corresponding to the light sources, an illuminating device capable of efficiently supplying light from the plurality of light sources is provided.

According to the exemplary embodiment, a phase plate can be desirably provided between the collimating optical system and the reflecting type polarizing plate. The phase plate converts, for example, linearly polarized light reflected by the reflecting type polarizing plate into circularly polarized light. The circularly polarized light advancing toward the light source is reflected by the reflecting portion provided at the light source and then transmitted through the phase plate again, so that the light is converted into linearly polarized light. For example, the use of the $\lambda/4$ phase plate allows linearly polarized light reflected by the reflecting type polarizing plate to be transmitted through the phase plate twice, so that the phase changes by $\lambda/2$. Therefore, part of the linearly polarized light reflected by the reflecting type polarizing plate can be converted into linearly polarized light in a particular oscillation direction before the light comes into the reflecting type polarizing plate again. The light converted into linearly polarized light in the particular oscillation direction can be transmitted through the reflecting type polarizing plate. Meanwhile, the linearly polarized light converted into light in another oscillation direction different from the particular oscillation direction by being transmitted through the phase plate again is reflected by the reflecting type polarizing plate and the above described recycling process is repeated. In this way, the use of the phase plate allows a desired linearly polarized optical component to be extracted even more efficiently. According to aspects of the invention, light can be entered in a direction substantially orthogonal to the phase plate. Since the light can be entered in a direction substantially orthogonal to the phase plate, the conversion between the linearly polarized light and the circularly polarized light can efficiently be carried out.

According to the exemplary embodiment, there is preferably provided a lens system that gathers polarized light transmitted through the reflecting type polarizing plate. The use of the lens system for gathering the polarized light allows the polarized light to efficiently advance to a particular region. In this way, the lens system advances the polarized light into the particular region, so that the light can efficiently be advanced to the particular region even when a plurality of light sources are provided in an array.

Furthermore, a projector according to the invention can include an illuminating device that supplies polarized light in a particular oscillation direction, a light guiding optical system that substantially equalizes the intensity distribution of the polarized light from the illuminating device, a spatial light modulator responsive to an image signal for modulating light from the light guiding optical system, and a projecting lens that projects the light from the spatial light modulator. The illuminating device can be the above-described illuminating device. Since the projector according to the invention can use the illuminating device described above, images with higher brightness can be obtained with high light use efficiency. Even when a plurality of light sources are arranged in an array, the light guiding optical system does not have to be large or a plurality of openings are not necessary at the end plane of incidence of the light guiding optical system. Therefore, the projector can be simple and compact.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Exemplary embodiments of the invention will be described in conjunction with the accompanying drawings.

Figure 1:
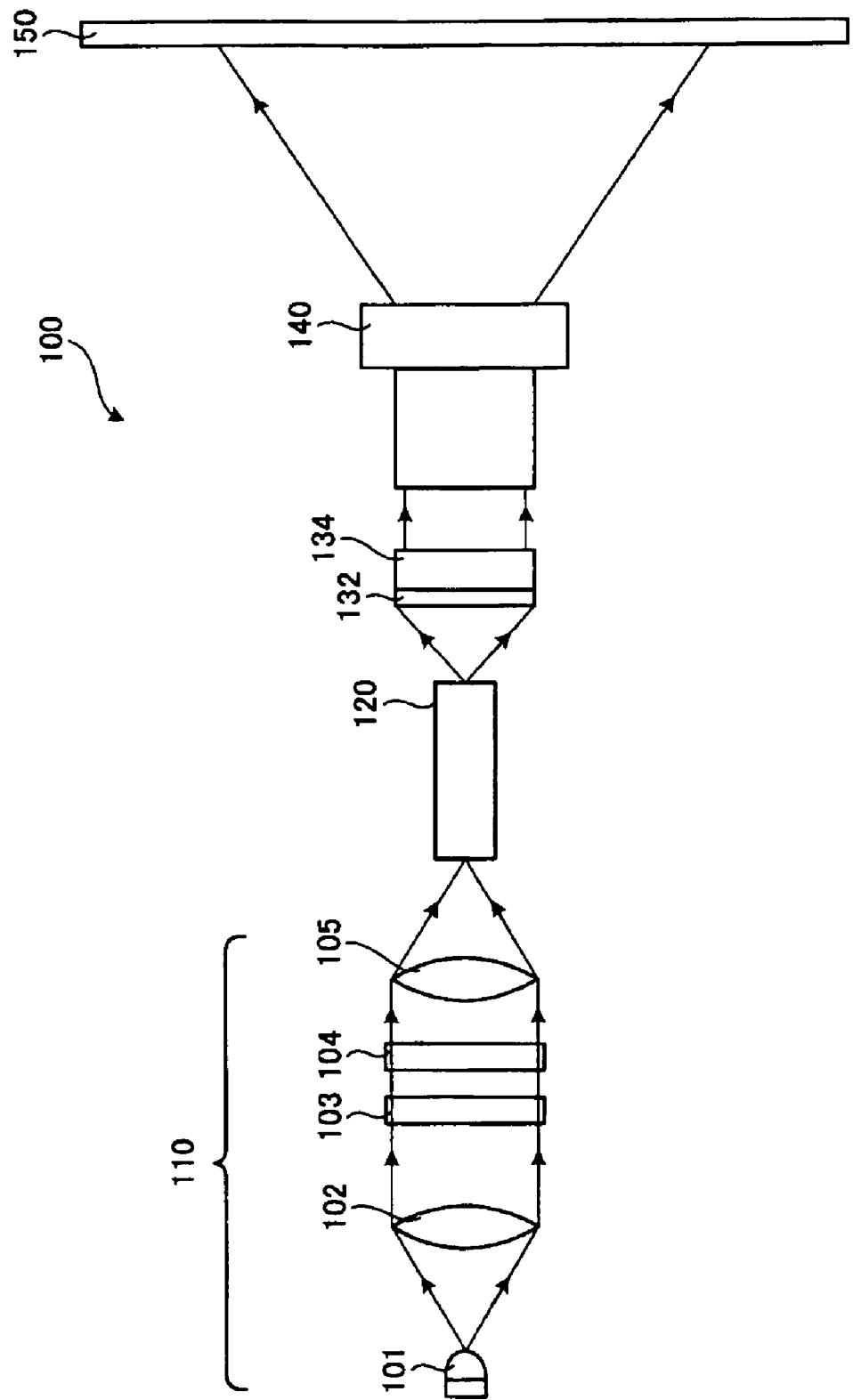
FIG. 1 is a schematic view of a projector according to a first exemplary embodiment of the invention.

FIG. 1 is a schematic diagram of a projector 100 according to a first exemplary embodiment of the invention. In the following description of the embodiment, the general construction of the projector 100 will be described, and then how polarized light is supplied by an illuminating device 110 in a particular oscillation direction will be described. The projector 100 can include the illuminating device 110, a rod integrator 120 as a light guiding optical system, a liquid crystal type spatial light modulator 134 as a spatial light modulator, and a projecting lens 140. The illuminating device 110 can include an LED 101, a collimator lens 102, a $\lambda/4$ phase plate 103, a reflecting type polarizing plate 104, and a condenser lens 105. The LED 101 serving as a light source supplies white light. The white light supplied from the LED 101 comes into the collimator lens 102 as a collimating optical system.

The collimator lens 102 collimates the light from the LED 101 into a substantially parallel beam. The light thus collimated by the collimator lens 102 is transmitted through the $\lambda/4$ phase plate 103 and then comes into the reflecting type polarizing plate 104. The reflecting type polarizing plate 104 transmits polarized light in a particular oscillation direction, such as a p-polarized beam in the light from the collimator lens 102. The reflecting type polarizing plate 104 reflects polarized light in another oscillation direction different from the particular oscillation direction in the light from the collimator lens 102. The reflecting type polarizing plate 104 reflects, for example, polarized light other than the p-polarized beam.

The polarized light transmitted through the reflecting type polarizing plate 104 is gathered by the condenser lens 105 in a region in the vicinity of the end plane of incidence of the rod integrator 120. In this way, the illuminating device 110 supplies the polarized light in the particular oscillation direction.

Note that when the collimator lens 102 and the condenser lens 105 may be made of Fresnel lenses. When they are made of Fresnel lenses, the illuminating device 110 can supply polarized light in a particular oscillation direction in the same way as the above.

The rod integrator 120 as a light guiding optical system substantially equalizes the intensity distribution of polarized light from the illuminating device 110. The rod integrator 120 can be made of a transparent glass member having an approximately rectangular cross section. Light coming into the rod integrator 120 advances inside the rod integrator 120 as it repeats total reflection at the interface between the glass member and the air. Instead of the one made of the glass member, the rod integrator 120 may alternatively be hollow inside and have the inner surface as a reflecting surface. Light coming into the rod integrator having the inner surface as a reflecting surface advances inside the rod integrator as it repeats reflecting at the reflecting surface. The rod integrator may be formed by combining a glass member and a reflecting surface. Polarized light may be gathered in the vicinity of the end plane of incidence of the rod integrator 120 using the condenser lens 105, so that polarized light in a particular oscillation direction can efficiently be entered into the rod integrator 120. Note that at the exit end plane of the rod integrator 120, there may be, for example, a condenser lens that gathers light while restricting the emitting direction so that the outgoing light from the exit end plane does not diffuse. At the exit end plane of the rod integrator, there may be, for example, an image forming lens that forms an image on the liquid crystal type spatial light modulator 134.

The light having its intensity distribution substantially equalized by the rod integrator 120 comes into a color filter 132. The color filter 132 is provided on the incidence side of the liquid crystal type spatial light modulator 134. The color filter 132 separates the white light from the illuminating device 110 into a red light beam R beam, a green light beam G beam, and a blue light beam B beam. The color filter 132 has an array of an R beam transmitting color filter, a G beam transmitting color filter, and a B beam transmitting color filter that are not shown. In the liquid crystal type spatial light modulator 134, there are an R beam liquid crystal layer, a G beam liquid crystal layer, and a B beam liquid crystal layer (that are not shown) corresponding to these color beam transmitting color filters. An R component beam in the white light is transmitted through the part of the color filter 132 provided with the R beam transmitting color filter. Meanwhile, B and G component beams are not transmitted through the R beam transmitting color filter but absorbed.

The R component beam transmitted through the R beam transmitting color filter comes into the R beam liquid crystal layer in the liquid crystal type spatial light modulator 134. The liquid crystal type spatial light modulator 134 is a so-called transmitting type liquid crystal display that transmits light through the liquid crystal layer in response to an image signal. Herein, the R beam supplied to the R beam liquid crystal layer is polarized light in a particular oscillation direction such as a p-polarized beam. The p-polarized beam having the R component coming into the R beam liquid crystal layer is converted into an s-polarized beam by modulation in response to an image signal. The R beam converted into the s-polarized beam by the modulation is let out from the liquid crystal type spatial light modulator 134. As with the R beam, the G beam and the B beam are modulated in response to an image signal and let out from the liquid crystal type spatial light modulator 134. In this way, a full color image can be obtained. The light from the liquid crystal type spatial light modulator 134 is projected on a screen 150 by the projecting lens 140.

Figure 2:
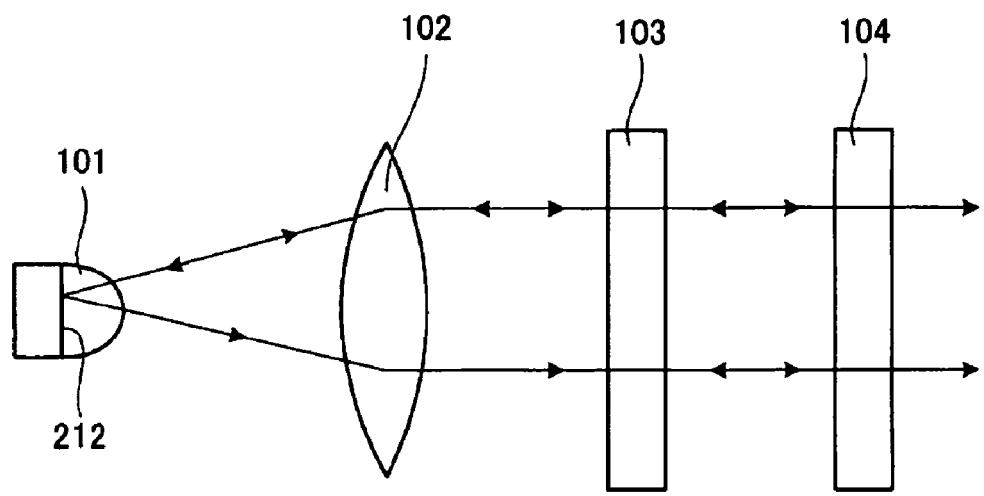
FIG. 2 is a view for explaining part of the construction of an illuminating device and an optical path.

Now, the construction of the illuminating device 110 will be described in detail. FIG. 2 shows the construction of part of the illuminating device 110 and an example of the optical path of light from the LED 101. As described above, the reflecting type polarizing plate 104 transmits polarized light in a particular oscillation direction, such as a p-polarized beam and reflects polarized light in another oscillation direction different from the particular oscillation direction, such as an s-polarized beam. At the time, the light coming into the reflecting type polarizing plate 104 is collimated by the collimator lens 102 into a parallel beam and therefore the light advances in a reverse direction in the substantially same optical path in which the light has entered the reflecting type polarizing plate 104. The s-polarized beam in the light reflected by the reflecting type polarizing plate 104 is converted into circularly polarized light as it is transmitted through the $\lambda/4$ phase plate 103. The light transmitted through the $\lambda/4$ phase plate 103 is transmitted through the collimator lens 102 and returns to the LED 101.

The LED 101 has a reflecting portion 212. The reflecting portion 212 may be made of a glossy member, for example, a metal member, such as aluminum and silver. The reflecting portion 212 made of a metal member has high thermal resistance. The light returned to the LED 101 is then reflected by the reflecting part 212 and advanced towards the collimator lens 102. The circularly polarized light beam in the light transmitted through the collimator lens 102 and again coming into the $\lambda/4$ phase plate 103 is converted, for example, into a linearly polarized, p-polarized beam. The p-polarized beam, a beam in a particular oscillation direction, can be transmitted through the reflecting type polarizing plate 104. Meanwhile, the linearly polarized beam can be converted to advance in another oscillation direction different from the particular oscillation direction by being transmitted through the $\lambda/4$ phase plate 103 is reflected by the reflecting type polarizing plate 104 again and the above described recycling process is repeated.

Figure 3:
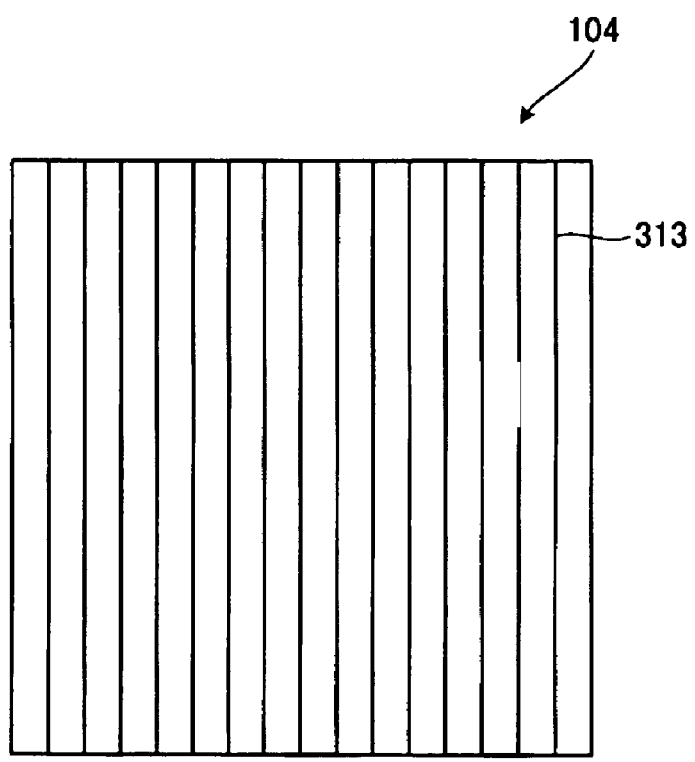
FIG. 3 is a plan view of a reflecting type polarizing plate.
Figure 4:
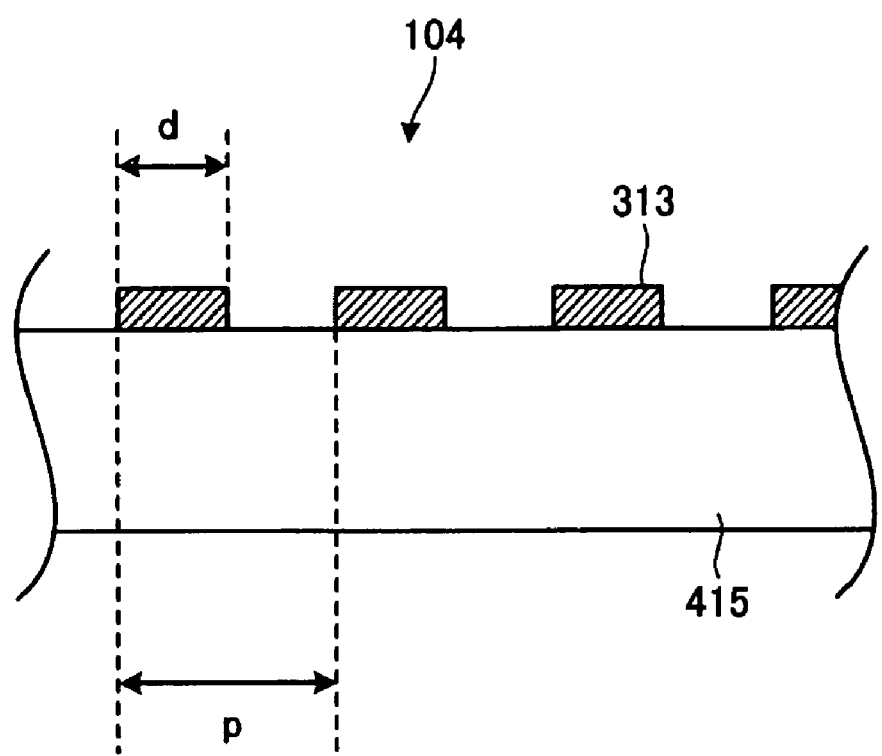
FIG. 4 is a sectional view of the reflecting type polarizing plate.

Now, the construction of the reflecting type polarizing plate 104 will be described. FIG. 3 is a plan view of the reflecting type polarizing plate 104. FIG. 4 is a sectional view of the reflecting type polarizing plate 104. The reflecting type polarizing plate 104 according to the exemplary embodiment may be produced by providing a metal wire 313, such as an aluminum wire, arranged in a grid shape on a substrate 415 of an optically transparent glass member, and in other words, a wire grid type polarizer may be used. The wire grid type polarizer has the wire 313 arranged in a grid shape having a pitch p of 150 nm and a width d of 70 nm to 80 nm. The wire grid type polarizer transmits polarized light whose oscillation direction is substantially orthogonal to the wire 313 and reflects polarized light whose oscillation direction is substantially parallel to the wire 313. Since the wire grid type polarizer is provided so that the wire 313 is substantially orthogonal to the particular oscillation direction of the polarized light, polarized light only in the particular oscillation direction is transmitted.

The collimator lens 102 between the LED 101 and the reflecting type polarizing plate 104 causes the light reflected by the reflecting type polarizing plate 104 to advance in a reverse direction the substantially same optical path in which the light has advanced toward the reflecting type polarizing plate 104. Therefore, the optical loss can be reduced, and the light reflected by the reflecting type polarizing plate 104 can efficiently be returned to the LED 101. The light returned toward the LED 101 from the reflecting type polarizing plate 104 is reflected by the reflecting portion 212 and again advances toward the reflecting type polarizing plate 104. In the recycling process of the polarized light in the optical path between the reflecting portion 212 and the reflecting type polarizing plate 104, the polarized light in the particular oscillation direction can sequentially be extracted by the reflecting type polarizing plate 104. Consequently, the polarized light in the particular oscillation direction can be obtained with high use efficiency. In this way, the polarized light in the particular oscillation direction can efficiently be supplied, and the illuminating device 110 suitable for the projector 100 using the liquid crystal type spatial light modulator 134 can be provided. Furthermore, the use of the illuminating device 110 advantageously allows the projector 100 to provide images with higher brightness of high light use efficiency.

The use of the λ/4 phase plate 103 allows linearly polarized light reflected by the reflecting type polarizing plate 104 to be transmitted through the phase plate twice, so that the phase changes by λ/2. Therefore, part of the linearly polarized light reflected by the reflecting type polarizing plate 104 can be converted into linearly polarized light in a particular oscillation direction before the beam comes into the reflecting type polarizing plate 104 again. For example, the s-polarized beam in a direction different from the particular oscillation direction in the light reflected by the reflecting type polarizing plate 104 has its phase changed by λ/2 and its polarization axis turned by 90° to be a p-polarized beam in the particular oscillation direction. In this way, the light converted into the linearly polarized light in the particular oscillation direction can be transmitted through the reflecting type polarizing plate 104. Meanwhile, the linearly polarized light converted into light in another oscillation direction different from the particular oscillation direction as it is again transmitted through the λ/4 phase plate 103 is reflected by the reflecting type polarizing plate 104 and the above described recycling process is repeated. In this way, a desired linearly polarized optical component can be extracted even more efficiently.

When, for example, linearly polarized light is entered obliquely to the λ/4 phase plate 103, elliptically polarized light can be partly generated besides circularly polarized light. When the elliptically polarized light is generated by the λ/4 phase plate 103, conversion between linearly polarized light and circularly polarized light cannot efficiently be carried out, and the change in the phase can vary. When light is entered to the reflecting type polarizing plate 104 in a direction substantially orthogonal to the reflecting type polarizing plate 104, the polarized light in the particular oscillation direction can efficiently be transmitted. When light is entered obliquely to the reflecting type polarizing plate 104, desired polarized light cannot efficiently be transmitted therethrough.

The illuminating device 110 according to the invention has light from the LED 101 collimated into a substantially parallel beam by the collimator lens 102, and therefore the light from the LED 101 can be entered in a direction substantially orthogonal to the λ/4 phase plate 103 and the reflecting type polarizing plate 104. Since the light can be entered in a direction substantially orthogonal to the λ/4 phase plate 103, the conversion between linearly polarized light and circularly polarized light can efficiently be carried out. Furthermore, since the light from the LED 101 is entered in a direction substantially orthogonal to the reflecting type polarizing plate 104, polarized light in a particular oscillation direction can efficiently be extracted. In this way, the light is collimated into a substantially parallel beam using the collimator lens 102, so that polarized light in a particular oscillation direction can efficiently be extracted.

Furthermore, according to aspects of the invention, the λ/4 phase plate 103 and the reflecting type polarizing plate 104 are provided outside the LED 101. In other words, the λ/4 phase plate 103 and the reflecting type polarizing plate 104 do not have to be provided inside the LED 101 and therefore they can be prevented from being thermally deteriorated. The reflecting portion 212 made of the metal member has high thermal resistance, and therefore the illuminating device 110 can carry out highly efficient illumination for a long duration. As the reflecting portion 212 of the LED 101, a conventional light emitting chip provided in the LED 101 may be used. By the use of the light emitting chip, the reflecting portion 212 may have a light emitting function in addition to the function as the reflecting portion 212 itself, so that the LED 101 can have a simpler construction and can more readily be produced.

Figure 5:
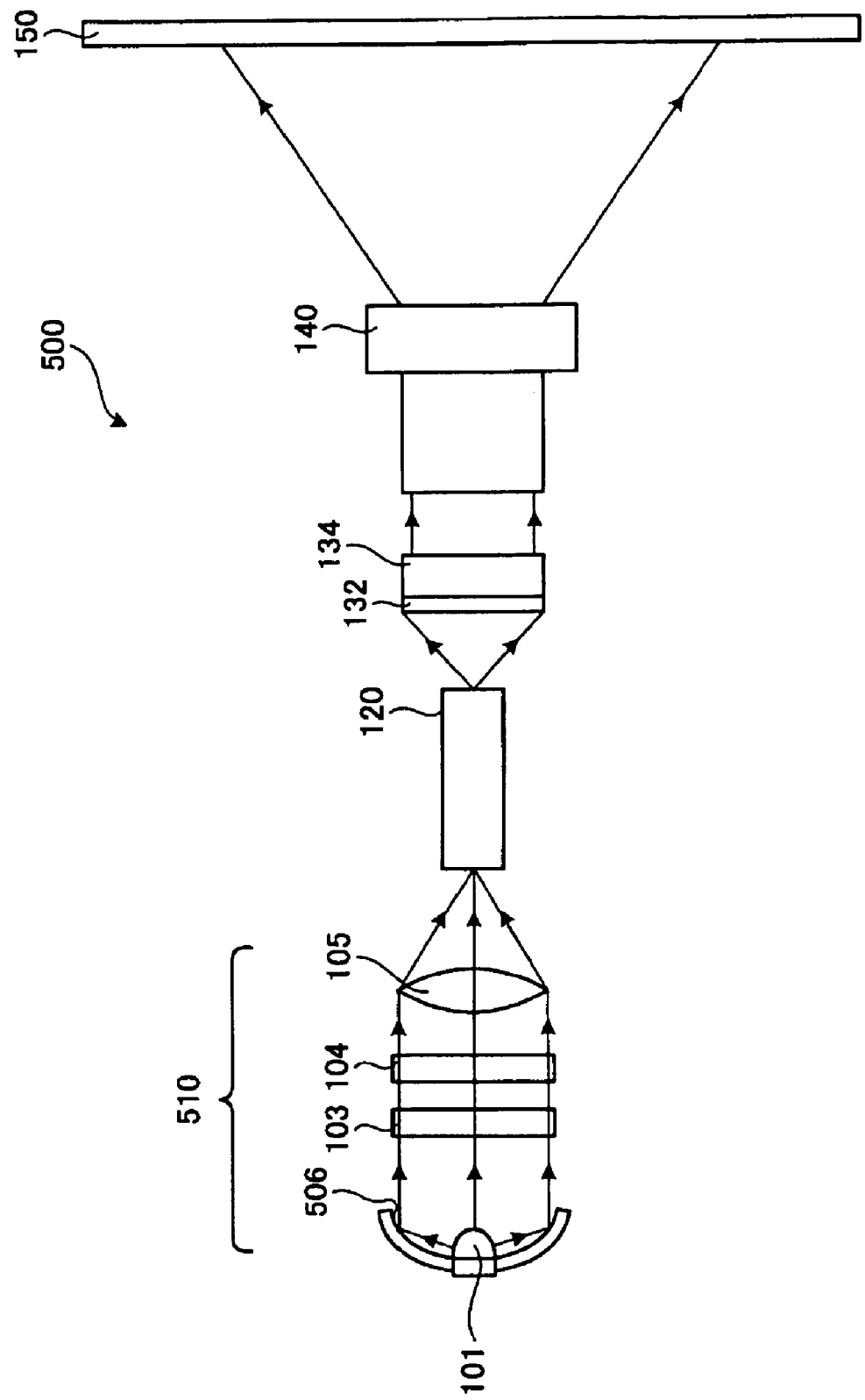
FIG. 5 is a schematic view of a projector according to a second exemplary embodiment of the invention.

FIG. 5 is a schematic view of a projector 500 according to a second exemplary embodiment of the invention. The same portions as those of the projector 100 according to the first exemplary embodiment are denoted by the same reference characters and the description will not be repeated. The projector 500 according to the exemplary embodiment can include a reflector 506 as a collimating optical system. An LED 101 allows light having high intensity to advance in the direction of its central axis. For example, using transparent resin capable of serving as a lens provided at the tip end of the LED 101, the light having high intensity can be advanced in the direction of the central axis of the LED 101. The light advancing toward the central axis of the LED 101 directly enters into the λ/4 phase plate 103.

Meanwhile, the light from the LED 101 partly advances in a direction other than the direction of the central axis of the LED 101. The part of the light advancing in the direction other than the direction of the central axis of the LED 101 comes into the reflector 506 as the collimating optical system. The reflector 506 can be made of a glossy metal member, such as aluminum and has a substantially parabolic reflecting surface. The reflector 506 surrounds the periphery of the LED 101 with the LED 101 as the center and has an opening directed toward the λ/4 phase plate 103.

The light coming into the reflector 506 from the LED 101 is reflected by the reflector 506 and advances toward the λ/4 phase plate 103. The optical path of the light reflected by the reflector 506 and advancing toward the λ/4 phase plate 103 is substantially parallel to the optical path of the light advancing in the direction of the central axis of the LED 101. In this way, the reflector 506 collimates the light from the LED 101 into a substantially parallel beam. The light coming into the λ/4 phase plate 103 directly from the LED 101 is reflected by the reflecting type polarizing plate 104 and then directly returns to the LED 101 from the λ/4 phase plate 103. The light coming into the λ/4 phase plate 103 through the reflector 506 from the LED is reflected by the reflecting type polarizing plate 104 and then returns to the LED 101 from the λ/4 phase plate 103 through the reflector 506.

In this way, the light reflected by the reflecting type polarizing plate 104 advances in a reverse direction and in the substantially same optical path in which the light has come into the reflecting type polarizing plate 104 similarly to the illuminating device 110 according to the first exemplary embodiment. Therefore, the illuminating device 510 can efficiently supply polarized light in a particular oscillation direction similarly to the illuminating device 110 according to the first exemplary embodiment.

A collimator lens may be provided between the LED 101 and the λ/4 phase plate 103. The collimator lens allows the light advancing in the direction other than that of the central axis of the LED 101 to be collimated into substantially parallel beams and guided to the λ/4 phase plate 103. The reflector 506 and the collimator lens may be used in combination, so that light can be supplied even more efficiently.

Figure 6:
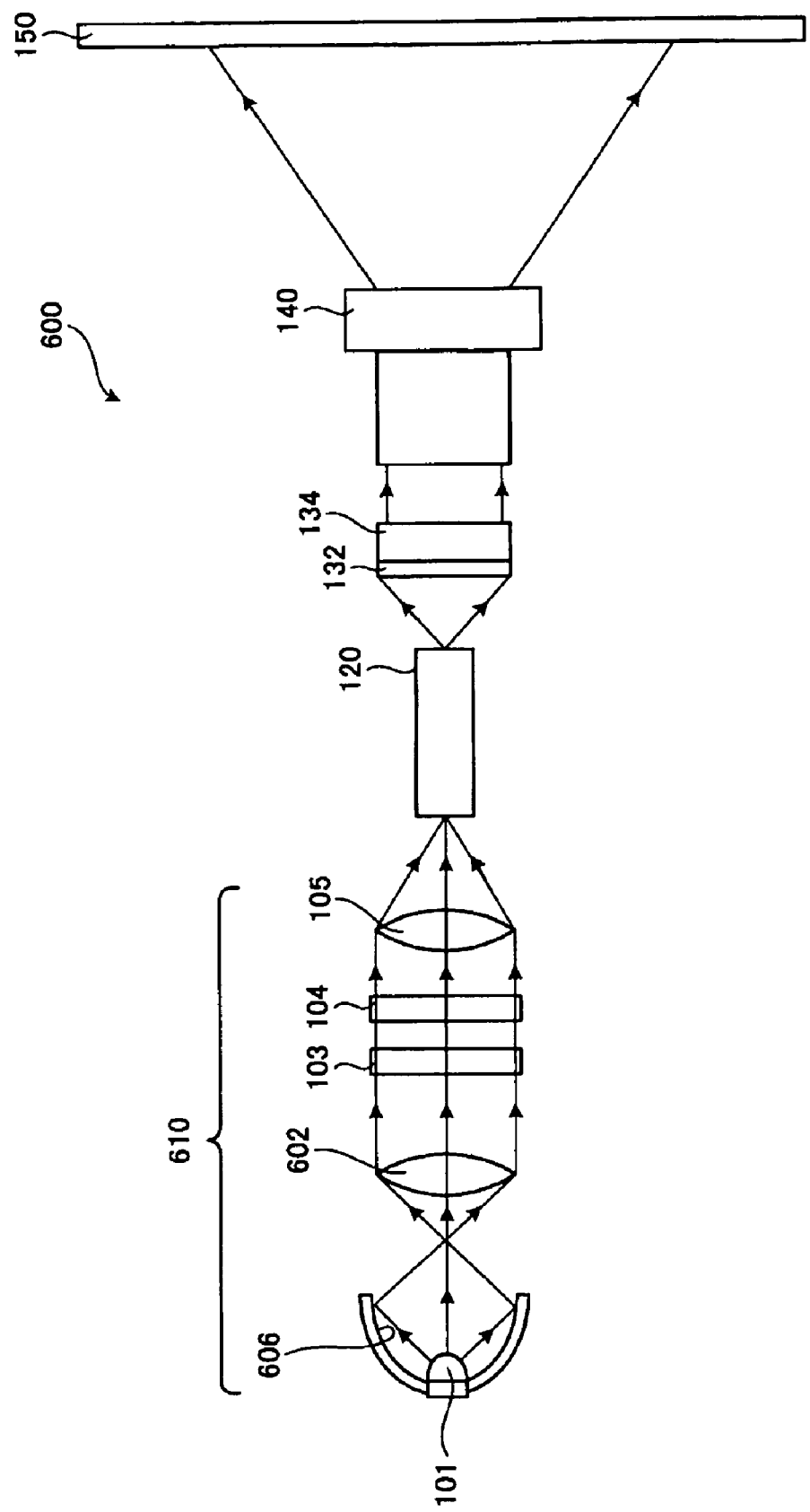
FIG. 6 is a schematic view of a projector according to a modification of the second exemplary embodiment.

FIG. 6 is a schematic view of a projector 600 according to a modification of the second exemplary embodiment. The same portions as those of the projector 500 according to the second exemplary embodiment described above are denoted by the same reference characters and the description will not be repeated. An illuminating device 610 in the projector 600 according to the modification includes a reflector 606 and a collimator lens 602 as a collimating optical system. Light advancing from the LED 101 in the direction of the central axis of the LED 101 directly enters the collimator lens 602. Light advancing in directions other than the direction of the central axis of the LED 101 partly comes into the reflector 606.

The reflector 606 can be made of a glossy metal member, such as aluminum, and has a substantially elliptical reflecting surface. Light coming into the reflector 606 is reflected by the reflector 606 and advances toward the collimator lens 602. The light coming into the collimator lens 602 is collimated into a substantially parallel beam and advances toward the λ/4 phase plate 103. Light reflected by the reflecting type polarizing plate 104 advances in a reverse direction in the substantially same optical path in which the light has come into the reflecting type polarizing plate 104, similarly to the case of the illuminating device 510 according to the second exemplary embodiment. In this way, using the substantially elliptical reflector 606 and the collimator lens 602 as the collimating optical system, polarized light in a particular oscillation direction can efficiently be supplied.

Figure 7:
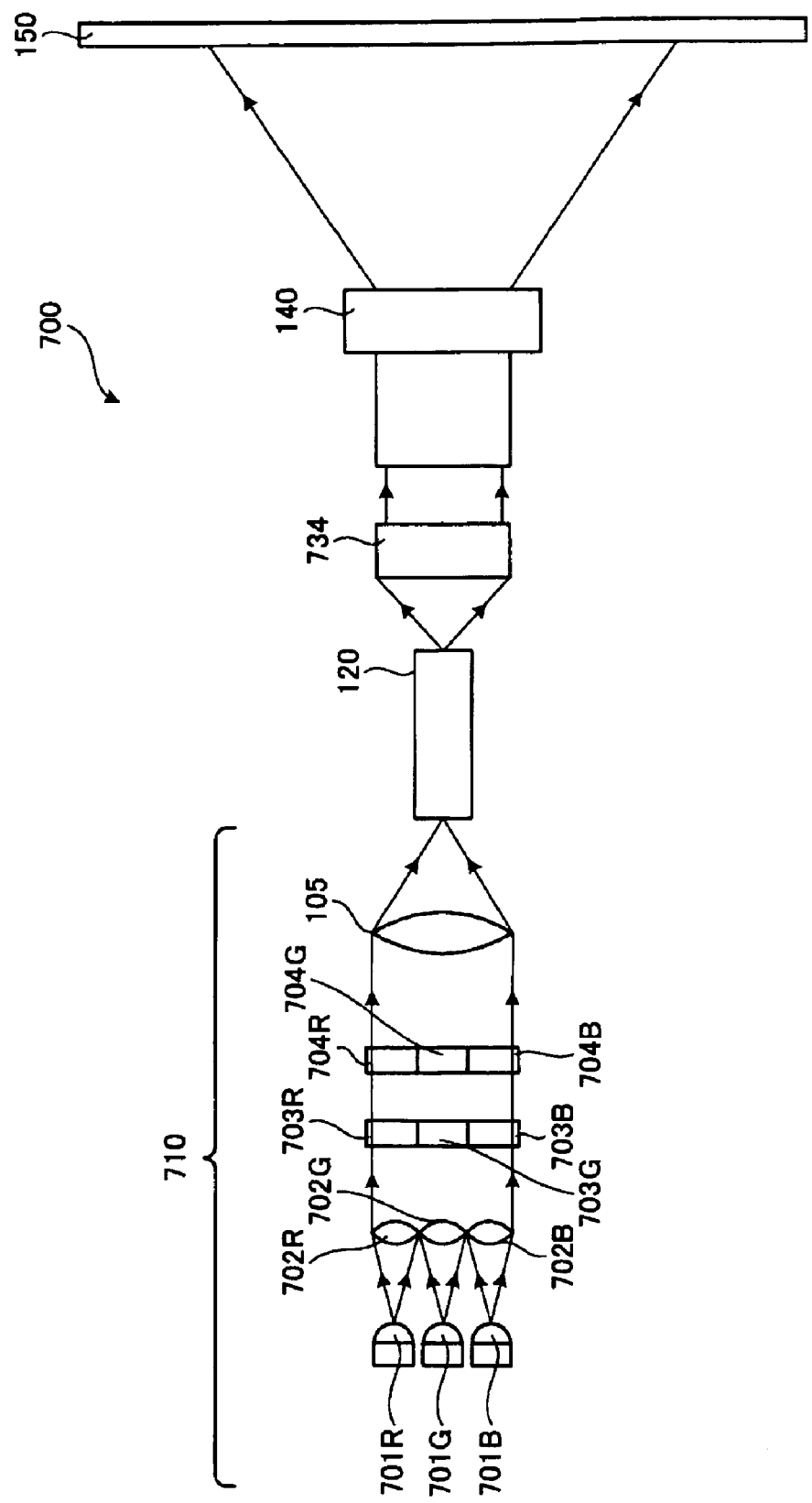
FIG. 7 is a schematic view of a projector according to a third exemplary embodiment of the invention.

FIG. 7 is a schematic view of a projector 700 according to a third embodiment of the invention. The same portions as those of the projector 100 according to the first exemplary embodiment are denoted by the same reference characters and the description will not be repeated. The projector 700 can include an illuminating device 710 having a plurality of LEDs arranged in an array. The illuminating device 710 includes an R beam LED 701R that supplies an R beam, a G beam LED 701G that supplies a G beam, and a B beam LED 701B that supplies a B beam, and these LEDs are arranged in an array.

Corresponding to the LEDs 701R, 701G, and 701B for the respective color beams, there are collimator lenses 702R, 702G, and 702B as a collimating optical system, λ/4 phase plates 703R, 703G, and 703B, and reflecting type polarizing plates 704R, 704G, and 704B. The collimator lenses 702R, 702G, and 702B, the λ/4 phase plates 703R, 703G, and 703B, and the reflecting type polarizing plates 704R, 704G, and 704B are respectively provided in an array corresponding to the LEDs.

The optical path of a R beam from the R beam LED 701R will be described first. The collimator 702R collimates the R beam from the R beam LED 701R into a substantially parallel beam. The substantially parallel beam collimated by the collimator lens 702R is transmitted through the λ/4 phase plate 703R and then comes into the reflecting type polarizing plate 704R. The reflecting type polarizing plate 704R transmits polarized light in a particular oscillation direction, such as a p-polarized beam, in the light from the collimator lens 702R. The reflecting type polarizing plate 704R reflects polarized light in another oscillation direction different from the particular oscillation direction in the light from the collimator lens 702R. The reflecting type polarizing plate 704R reflects, for example, polarized light other than the p-polarized beam. The light transmitted through the reflecting type polarizing plate 704R is gathered by the condenser lens 105 in a region in the vicinity of the end plane of incidence of the rod integrator 120.

Similarly to the illustrating device 110 according to the first exemplary embodiment, the light reflected by the reflecting type polarizing plate 704R advances I a reverse direction in the substantially same optical path in which the light has come into the reflecting type polarizing plate 704R and returns to the R beam LED 701R. The R beam LED 701R is provided with a reflecting portion (not shown) similarly to the LED 101 according to the first embodiment. The light returned to the R beam LED 701R is reflected by the reflecting portion and again advances toward the collimator lens 702R. In this way, in the process in which polarized light recycles in the optical path between the reflecting portion and the reflecting type polarizing plate 704R, polarized light in a particular oscillation direction can sequentially be extracted by the reflecting type polarizing plate 704R. Similarly to the R beam, as for the G beam from the G beam LED 701G and the B beam from the B beam LED 701B, polarized light in a particular oscillation direction can sequentially be extracted.

The respective color beams substantially equalized by the rod integrator 120 are entered into a liquid crystal type spatial light modulator 734 as a spatial light modulator. The liquid crystal type spatial light modulator 734 modulates the respective color beams from the illuminating device 710 in response to image signals. Now, the modulation of the respective color beams from the illuminating device 710 will be described. The LEDs 701R, 701G, and 701B for the respective color beams can be switched on and off at high speed. Therefore, the illumination timing for the LEDs 701R, 701G, and 701B in the illuminating device 710 may be varied in response to image signals, so that the color beams can be modulated using the single liquid crystal type spatial light modulator 734.

In order to obtain a projected image in white as a whole by sequentially projecting the R beam, G beam, and B beam, the flux amount of the G beam must be 60% to 80% of the entire flux amount. If the throughput and the number of the LEDs 701R, 701G, and 701B are equal, the flux amount of the G beam is insufficient. Therefore, the period of turning on the LED 701G for the color G is set longer than those for the R beam LED 701R and the B beam LED 701B. The number of the G beam LEDs 701R is set to be larger than those of the R beam LEDs 701R and the B beam LEDs 701B, so that the period of turning on the G beam LEDs 701G can be equal or shorter than those of the R beam LEDs 701R and the B beam LEDs 701B. In this way, a well color-balanced projected image can be obtained.

The illuminating device 710 can supply polarized light in a particular oscillation direction without doubling the beam from the LEDs. Therefore, even when a plurality of LEDs are arranged in an array, the beam can efficiently be used in the optical system of the projector 700. In this way, the illuminating device 710 can easily be adapted to the arrangement of a plurality of LEDs in an array. When the LEDs 701R, 701G, and 701B are provided in an array, the illuminating device 710 may have collimator lenses, λ/4 phase plates and reflecting type polarizing plates arranged in an array corresponding to the LEDs. Since the collimator lenses, λ/4 phase plates and reflecting type polarizing plates are arranged corresponding to the LEDs, the elements suitable for the wavelength characteristics of the R, G, and B beams can be used, and light from the plurality of LEDs can efficiently be supplied.

The use of the condenser lens 105 allows polarized light to efficiently advance in the vicinity of the end plane of incidence of the rod integrator 120 even when a plurality of LEDs are arranged in an array. In this way, light from the plurality of LEDs can efficiently be supplied. According to the exemplary embodiment, the rod integrator 120 does not have to have a large size corresponding to the region where the LEDs are provided or a plurality of openings are not necessary at the end plane of incidence of the rod integrator 120 corresponding to the LEDs. Therefore, the projector 700 can be simple and compact as compared to the construction in which light is recycled only within the rod integrator.

Figure 8:
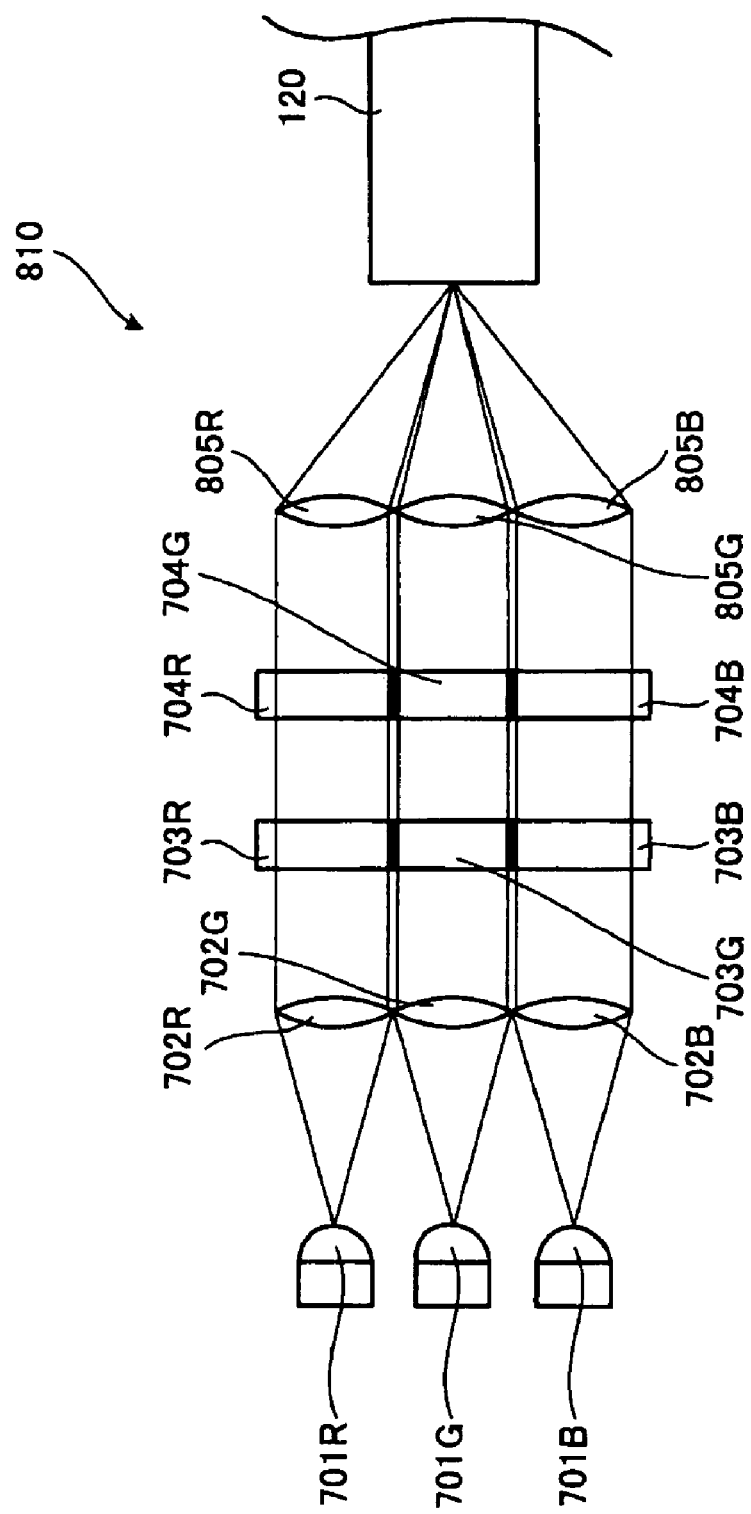
FIG. 8 is a schematic view of a projector according to a modification of the third exemplary embodiment.

FIG. 8 is a schematic view of an illuminating device 810 according to a modification of the illuminating device 710. The illuminating device 810 according to the modification can be applied to the projector 700. The illuminating device 810 includes condenser lenses 805R, 805G, and 805B arranged in an array corresponding to the LEDs 701R, 701G, and 701B for the respective color beams. The condenser lenses 805R, 805G, and 805B preferably have incoming light decentered toward the end plane of incidence of the rod integrator 120 so that the light is gathered in the vicinity of the end plane of incidence of the rod integrator 120. In this way, light from the plurality of LEDs can efficiently be supplied.

It should be understood that the manner of providing a collimating optical system and a reflecting polarizing plate corresponding to each of a plurality of LEDs is not limited to that of the exemplary embodiments. For example, similar to the illuminating device 510 according to the second exemplary embodiment, the LEDs may be provided with a reflector or/and a collimator lens. Note that the illuminating devices 710 and 810 use the R beam LED, G beam LED, and B beam LED as the light source, but a plurality of white light LEDs may be used similarly to the first exemplary embodiment. When the plurality of white light LEDs are used, the white light is preferably color-separated using color filters similarly to the first embodiment. According to the exemplary embodiment, the three color beams are used, but four color beams may be used. According to the above embodiment, the $\lambda/4$ phase plates and the reflecting type polarizing plates are provided corresponding to the plurality of LEDs, but a single $\lambda/4$ phase plate and a single reflecting type polarizing plate may be provided for the plurality of LEDs.

According to the exemplary embodiments, the LEDs are used as the light source for the illuminating device, but a solid light emitting device other than an LED, an light emitting body other than the solid light emitting device such as a ultra-high pressure mercury lamp and a halogen lamp may be used. As the liquid crystal type spatial light modulator, instead of the transmitting type liquid crystal display, a so-called reflecting type liquid crystal display that reflects light in response to image signals may be used. Instead of the single liquid crystal type spatial light modulator, a three-plate type projector having three liquid crystal type spatial light modulators may be used. The three-plate type projector has an illuminating device for each of R, G, and B beams. The three liquid crystal type spatial light modulators modulate the R, G, and B beams respectively in response to image signals. The modulated color beams are combined to obtain an image to project.

As in the foregoing, the illuminating device according to the invention can be useful as an illuminating device for a projector and particularly suitably used as an illuminating device for a projector including a liquid crystal type optical modulator.

While this invention has been described in conjunction with the specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An illuminating device, comprising:
   a light source that supplies light;
   a collimating optical system that collimates light from said light source into a substantially parallel beam;
   a reflecting type polarizing plate that transmits polarized light having a particular oscillation direction in the light from said collimating optical system and that reflects polarized light having another oscillation direction different from said particular oscillation direction; and
   a reflecting portion comprised by said reflecting type polarizing plate that reflects the light received by said reflecting type polarizing plate to advance toward said light source in the direction of said collimating optical system.

2. The illuminating device according to claim 1, said collimating optical system including a collimator lens.

3. The illuminating device according to claim 1, a plurality of said light sources being provided in an array; and
   a plurality of said collimating optical systems and a plurality of said reflecting type polarizing plates being provided in an array corresponding to said light sources.

4. The illuminating device according claim 1, a phase plate being provided between said collimating optical system and said reflecting type polarizing plate.

5. The illuminating device according to claim 1, further comprising:
   a lens system that gathers said polarized light transmitted through said reflecting type polarizing plate.

6. A projector, comprising:
   an illuminating device that supplies polarized light in a particular oscillation direction;
   a spatial light modulator that is responsive to an image signal that modulates the light from said illuminating device; and
   a projecting lens that projects the light from said spatial light modulator;
   said illuminating device being the illuminating device according to claim 1.

7. The projector according to claim 6, said collimating optical system being at least one of a collimator lens and a reflector.

8. The projector according to claim 6, a plurality of said light sources being provided in an array; and
   a plurality of said collimating optical systems and a plurality of said reflecting type polarizing plates being provided in an array corresponding to said light sources.

9. The projector according claim 6, a phase plate being provided between said collimating optical system and said reflecting type polarizing plate.

10. The projector according to claim 6, further comprising:
    a lens system that gathers said polarized light transmitted through said reflecting type polarizing plate.

11. The projector according to claim 6, further comprising:
    a light guiding optical system that substantially equalizes the intensity distribution of said polarized light from said illuminating device.

* * * * *